United States Patent [19]

Isnardi

[11] Patent Number: 4,782,383
[45] Date of Patent: Nov. 1, 1988

[54] APPARATUS FOR PROCESSING HIGH FREQUENCY EDGE INFORMATION IN A WIDESCREEN TELEVISION SYSTEM

[75] Inventor: Michael A. Isnardi, Plainsboro, N.J.

[73] Assignee: General Electric Company, Princeton, N.J.

[21] Appl. No.: 89,637

[22] Filed: Aug. 26, 1987

Related U.S. Application Data

[62] Division of Ser. No. 78,341, Jul. 27, 1987.

[51] Int. Cl.$^4$ .......................................... H04N 11/00
[52] U.S. Cl. ..................................................... 358/12
[58] Field of Search ...................... 358/12, 15, 16, 141, 358/142

[56] References Cited

U.S. PATENT DOCUMENTS

| | | | |
|---|---|---|---|
| 4,551,754 | 11/1985 | Meise et al. | 358/180 |
| 4,630,099 | 12/1986 | Rzeszewski | 358/12 |
| 4,631,584 | 12/1986 | Reitmeier | 358/141 |
| 4,660,072 | 4/1921 | Fukinuki | 358/12 |
| 4,661,850 | 4/1987 | Strolle et al. | 358/12 |

OTHER PUBLICATIONS

"A Fully Compatible Extended Definition Television System Capable of Increasing the Aspect Ratio", Yasumoto et al., Matsushita.

"An Extended Definition Television System Using Quadrature Modulation of the Video Carrier with Inverse Nyquist Filler", Yasumoto et al., IEEE Transactions on Consumer Electronics, Aug. 1987, vol. CE-33, No. 3, pp. 173-180.

"Extended Definition TV Fully Compatible with Existing Standards"—T. Fukinuki, IEEE Transactions on Communications, vol. Com-32, No. 8, Aug. 1984, pp. 948-953.

"A Fully Compatible Extended Definition Television System Transmitting High Components of Luminance and Chrominance"—S. Kageyama et al., Matsushita Co.

"Cooperative Processing for Improved NTSC Chrominance/Luminance Separation"—C. Strolle, SMPTE Journal," Aug. 1986, pp. 782-789.

"Three Dimensional Spectrum and Processing of Digital NTSC Color Signals"—E. Dubois et al., SMPTE Journal, Apr. 1982, pp. 372-378.

Primary Examiner—John W. Shepperd
Attorney, Agent, or Firm—Paul J. Rasmussen; Peter M. Emanuel; Ronald H. Kurdyla

[57] ABSTRACT

In a system for encoding a widescreen video signal containing left side, right side and center panel image components and luminance (Y) and chrominance (I,Q) information, first and second encoded signals containing side panel high frequency components ("highs") are generated simultaneously for each horizontal image line. Left and right chrominance side panel highs $I_L$, $I_R$ and $Q_L$, $Q_R$ remain in their respective horizontal spatial positions in the first and second signals. Left and right luminance side panel highs $Y_L$, $Y_R$ are time expanded and spatially shifted to fill the gap between the chrominance highs in the first and second signals. Thus the first signal contains the side panel highs in the sequence $I_L, Y_L, I_R$, and the second signal contains the side panel highs in the pattern $Q_L, Y_R, Q_R$.

26 Claims, 16 Drawing Sheets

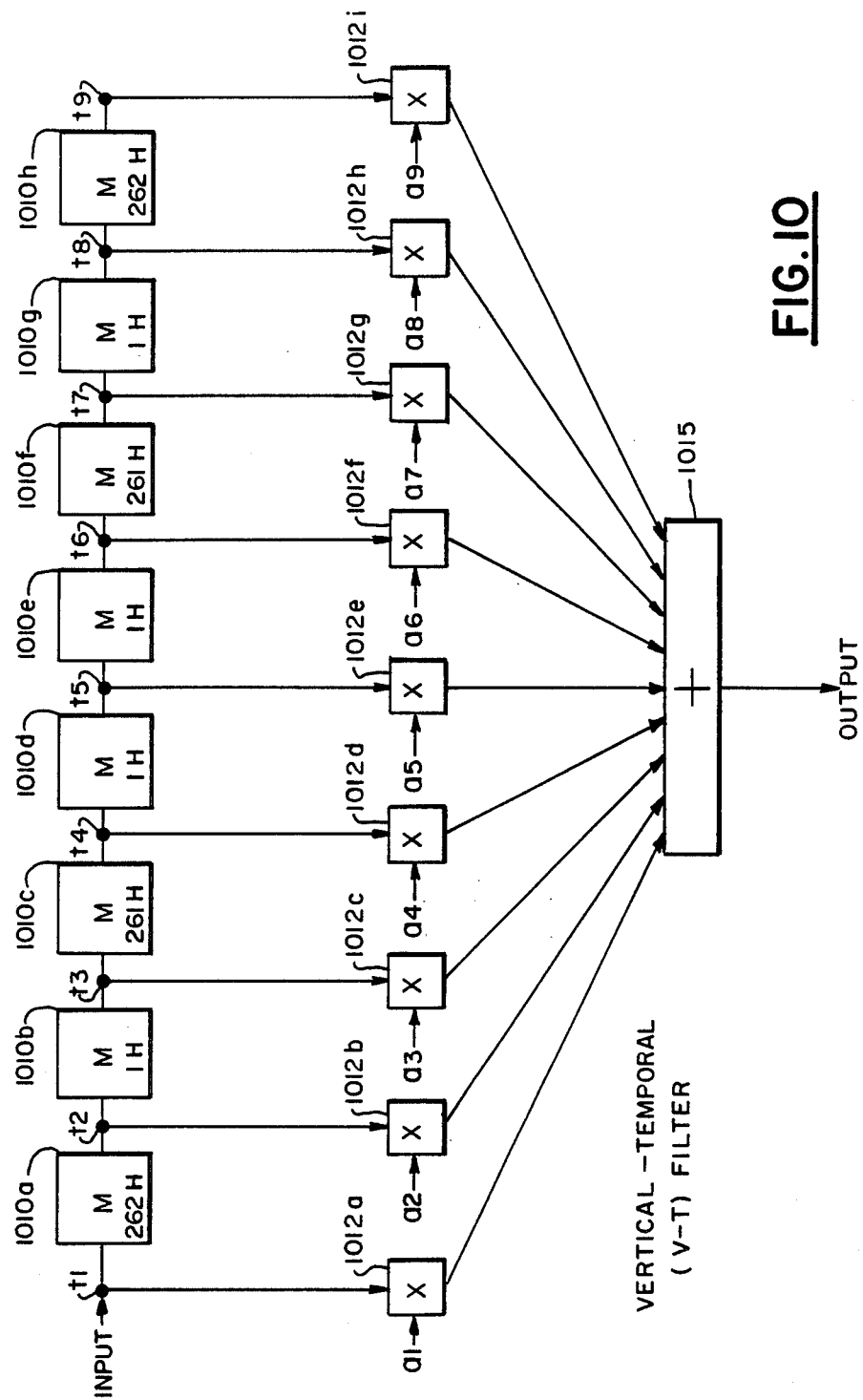

| | WEIGHTING COEFFICIENTS | | | | | | | | |
|---|---|---|---|---|---|---|---|---|---|
| | $a_1$ | $a_2$ | $a_3$ | $a_4$ | $a_5$ | $a_6$ | $a_7$ | $a_8$ | $a_9$ |
| V.T. BANDPASS FILTER | $\frac{1}{16}$ | $-\frac{1}{8}$ | $\frac{1}{8}$ | $-\frac{1}{16}$ | $\frac{1}{4}$ | $-\frac{1}{16}$ | $\frac{1}{8}$ | $-\frac{1}{8}$ | $\frac{1}{16}$ |
| V.T. BANDSTOP FILTER | $\frac{1}{16}$ | $\frac{1}{8}$ | $-\frac{1}{8}$ | $\frac{1}{16}$ | $\frac{3}{4}$ | $\frac{1}{16}$ | $-\frac{1}{8}$ | $\frac{1}{8}$ | $\frac{1}{16}$ |
FIG. 10a
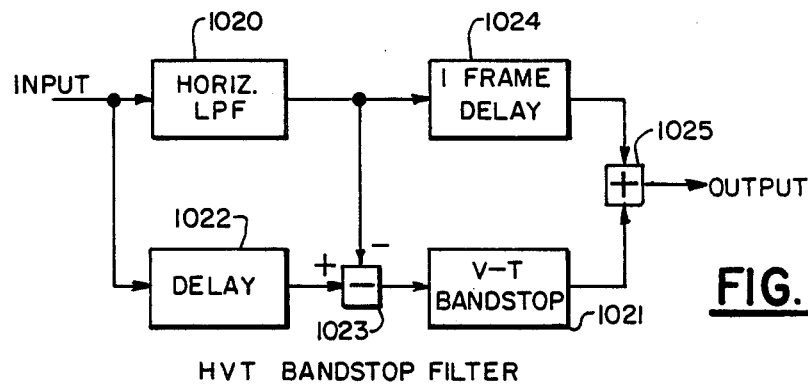
HVT BANDSTOP FILTER
FIG. 10b
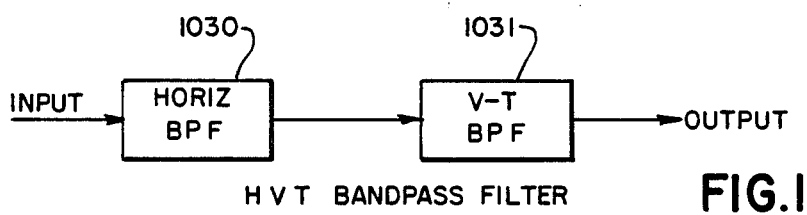
HVT BANDPASS FILTER
FIG. 10c

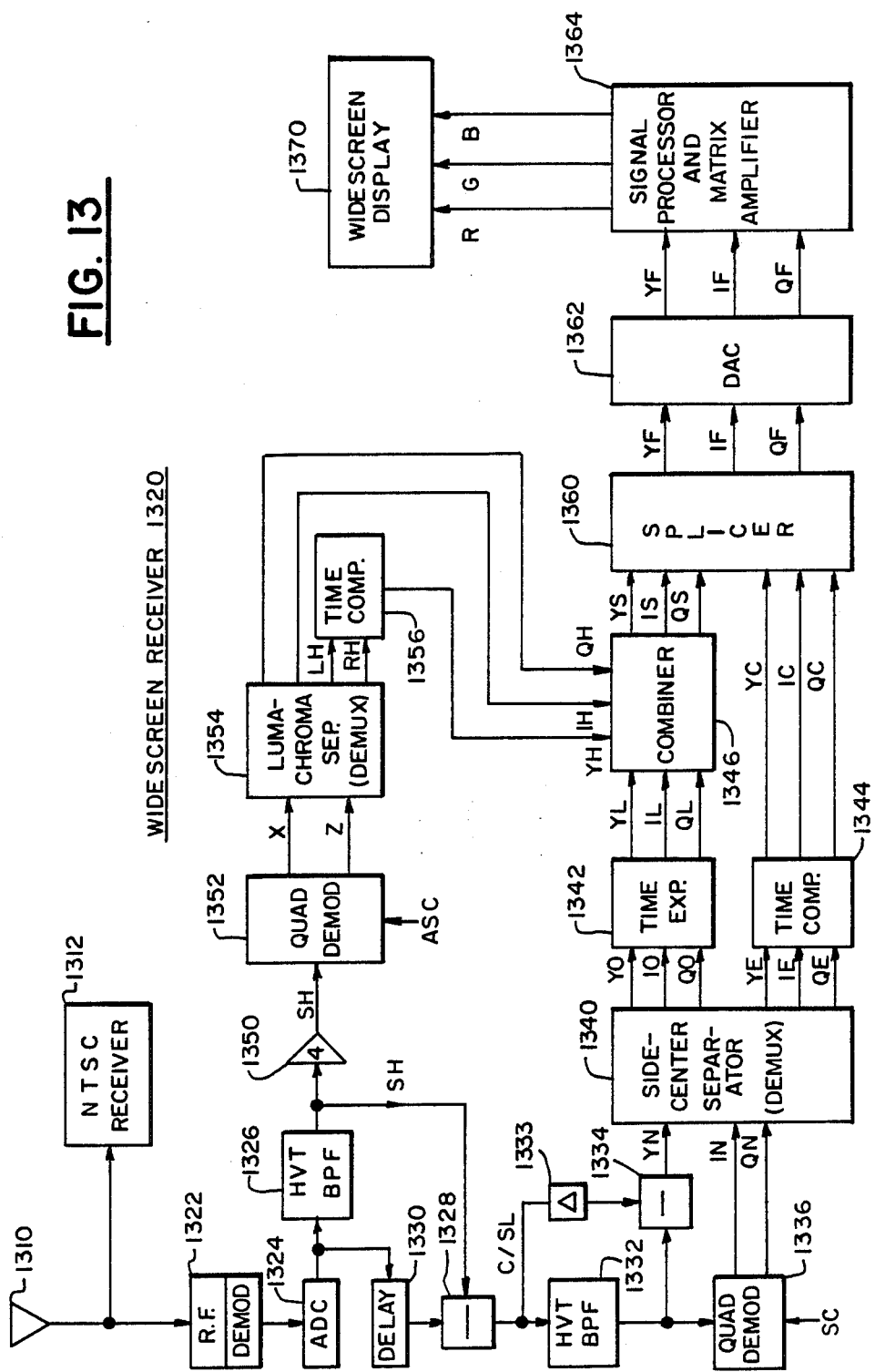

APPARATUS FOR PROCESSING HIGH FREQUENCY EDGE INFORMATION IN A WIDESCREEN TELEVISION SYSTEM

This application is a divisional of application Ser. No. 078,341, filed July 27, 1987.

BACKGROUND OF THE INVENTION

This invention concerns a widescreen television system that is compatible with conventional television receivers having a relatively smaller display aspect ratio.

A conventional television receiver, such as a receiver in accordance with NTSC broadcast standards adopted in the United States and elsewhere, has a 4:3 aspect ratio (the ratio of the width to the height of a displayed image). Recently, there has been interest in using higher aspect ratios for television receiver systems, such as 2:1, 16:9 or 5:3, since such higher aspect ratios more nearly approximate or equal the aspect ratio of the human eye than does the 4:3 aspect ratio of a conventional television receiver. Video information signals with a 5:3 aspect ratio have received particular attention since this ratio approximates that of motion picture film, and thus such signals can be transmitted and received without cropping the image information. However, widescreen television systems which simply transmit signals having an increased aspect ratio as compared to conventional systems are incompatible with conventional aspect ratio receivers. This makes widespread adoption of widescreen systems difficult.

It is therefore desirable to have a widescreen television system that is compatible with conventional television receivers. In accordance with the principles of the present invention, there are disclosed herein method and apparatus for encoding and decoding a compatible widescreen video signal representing a picture having an aspect ratio greater than the standard 4:3 aspect ratio.

SUMMARY OF THE INVENTION

In a disclosed preferred embodiment of a compatible widescreen television system in accordance with the principles of the present invention, a widescreen signal having left side, right side and center video information panels is converted into a signal compatible with a standard system, such as NTSC for example, by compressing side panel low frequency information of the widescreen signal into left and right overscan regions which are present in the standard system but not seen by a viewer, and by simultaneously time expanding the center panel information to occupy the standard display region seen by a viewer. High frequency side panel information is encoded by modulating such high frequency information on an alternate subcarrier signal other than the chrominance subcarrier.

Specifically, the side panel high frequency information comprises left and right side panel high frequency luminance components (luminance highs) and left and right side panel high frequency chrominance components (chrominance highs). A pair of horizontal line signals containing side panel highs is locally generated for each horizontal image scanning line. The left and right chrominance highs remain in their respective spatial positions along each locally generated horizontal line signal. However, the left and right side luminance highs are spatially shifted to fill the gaps between the chrominance highs on each of the locally generated horizontal line signals, repsectively.

DESCRIPTION OF THE DRAWING

FIGS. 6-10, 12 and 12a-12d illustrate aspects of the system of FIG. 1 in greater detail;

FIGS. 10a-10c illustrate aspects of filter arrangements related to a filter network shown in FIG. 10;

FIG. 13 shows a block diagram of a portion of a widescreen television receiver including decoder apparatus in accordance with the present invention.

A brief overview of the system to be described will be helpful. A system intended to transmit wide aspect ratio pictures, e.g., 5:3, through a standard, e.g., NTSC, channel should achieve a high quality picture display by a widescreen receiver, while greatly reducing or eliminating observable degradations in a standard 4:3 aspect ratio display. The use of signal compression techniques on the side panels of a picture takes advantage of the horizontal overscan region of a standard NTSC television receiver display, but may sacrifice image resolution in the side panel regions of a reconstructed widescreen picture. Since compression in time results in an expansion in the frequency domain, only low frequency components would survive processing in a standard television channel, which exhibits a smaller bandwidth compared with that required for a widescreen signal. Thus, when the compressed side panels of a compatible widescreen signal are expanded in a widescreen receiver, there results a noticeable difference between the resolution or high frequency content of the center portion of a displayed widescreen picture and the side panels, unless steps are taken to avoid this effect.

The Figures and associated description describe a system for developing a widescreen signal capable of being processed through a standard NTSC channel. The system also permits a widescreen receiver to recover a widescreen picture with good picture quality across the entire display.

Figure 1:
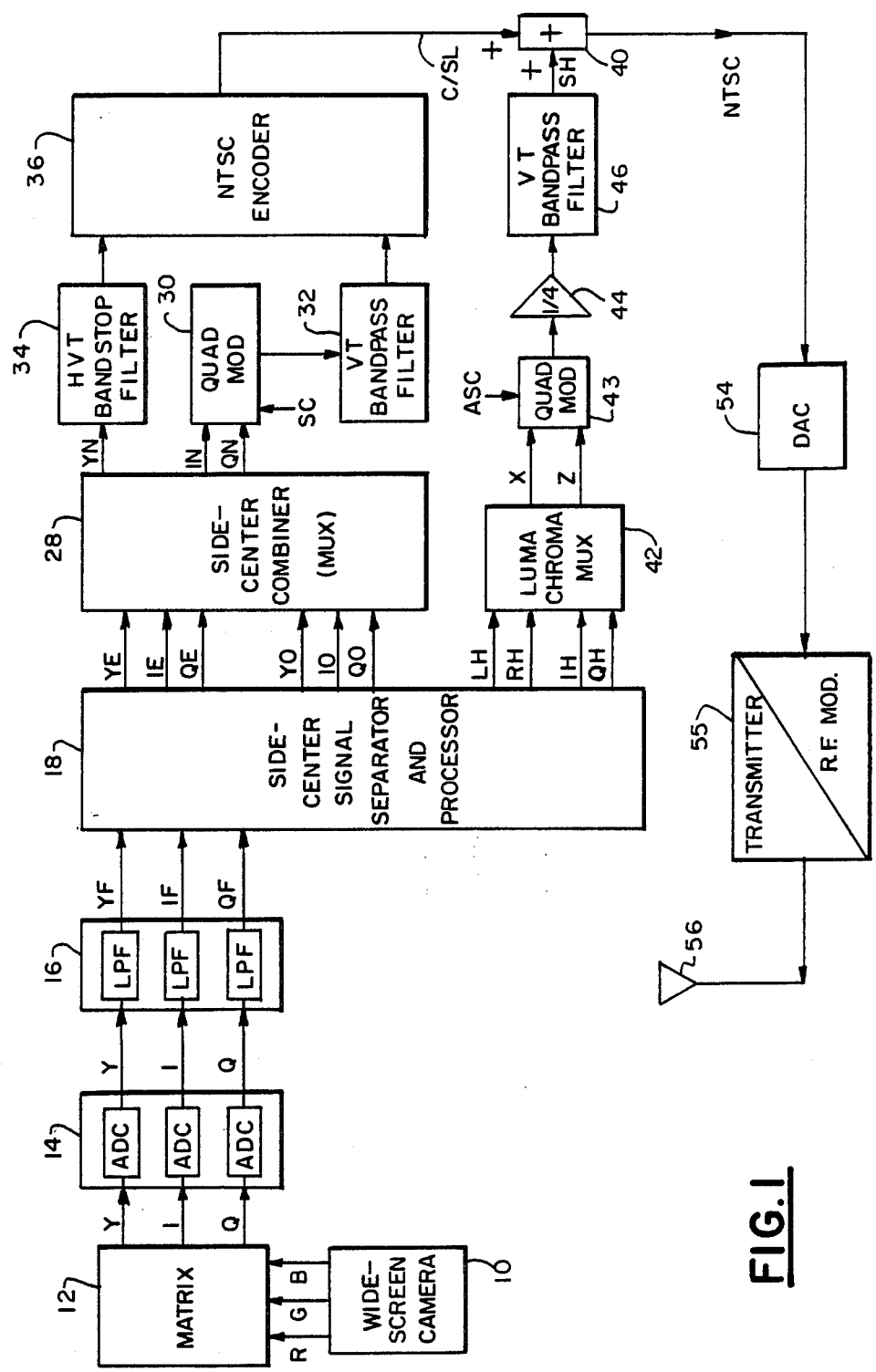
FIG. 1 shows a block diagram of an encoder for a compatible widescreen television system in accordance with the principles of the present invention.

As will be seen from the encoder of FIG. 1, the use of spatial compression allows low frequency side panel information to be squeezed into the horizontal overscan region of a standard NTSC signal. The high frequency side panel information is spectrally shared with the standard NTSC signal through the video transmission channel, in a manner transparent to a standard receiver, through the use of an alternate subcarrier modulation technique.

Figure 2:
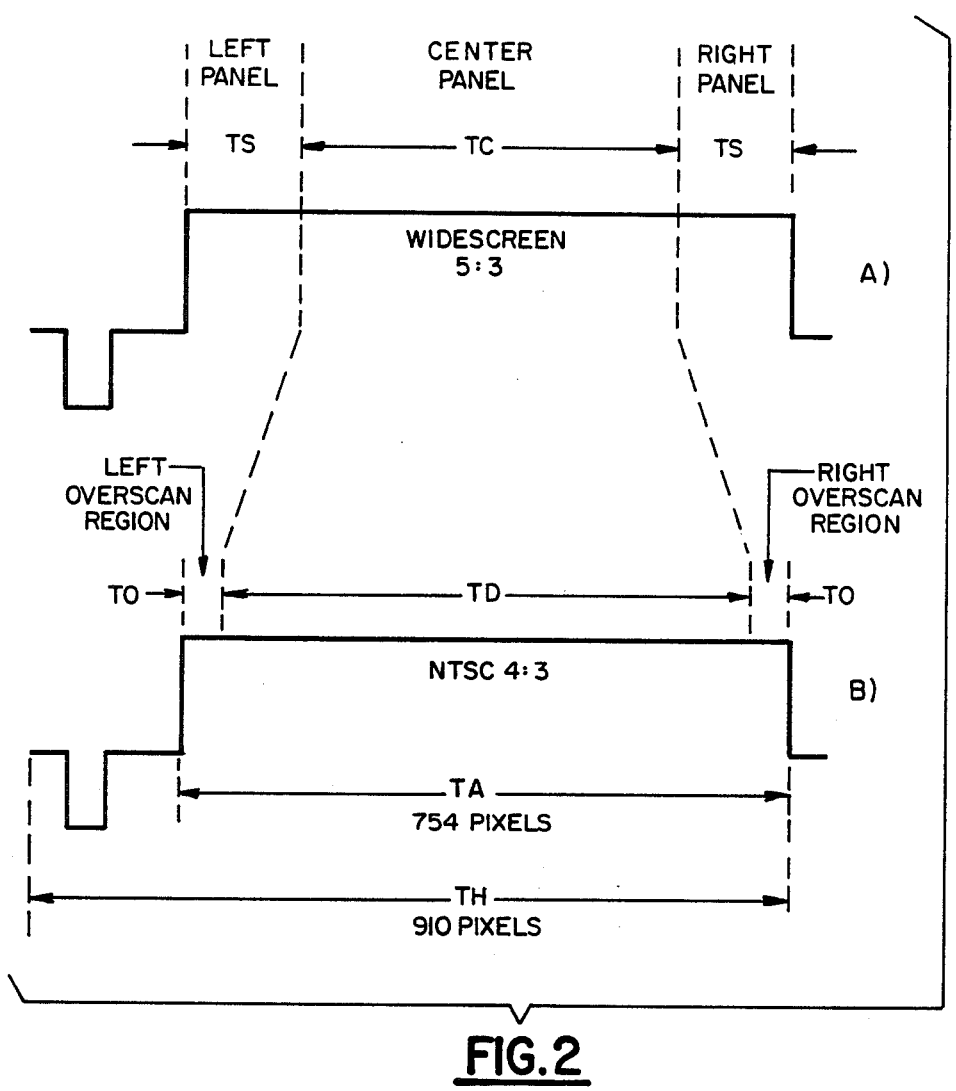
FIGS. 2-5 depict signal waveforms helpful in understanding the operation of the system of FIG. 1.

Before discussing the compatible widescreen encoding system of FIG. 1, reference is made to signal waveforms A and B of FIG. 2. Signal A is a 5:3 aspect ratio widescreen signal that has been converted to a standard NTSC compatible signal with a 4:3 aspect ratio as indicated by signal B. Widescreen signal A includes left and right side panel portions each associated with intervals TS which typically are of equal duration, and a center panel portion associated with an interval TC. Widescreen signal A has been converted to NTSC signal B by compressing certain side panel information completely into the horizontal overscan regions associated with time intervals TO. The NTSC signal has an active line interval TA (approximately 52.5 microseconds duration) which encompasses overscan intervals TO, a display time interval TD which contains the video information to be displayed, and a total horizontal line time interval TH of approximately 63.556 microseconds duration. Intervals TA and TH are the same for both the widescreen and NTSC signals. It has been found that almost all consumer television receivers have an overscan interval which occupies at least 4% of the total active line time TA, i.e., 2% overscan on the left and right sides. At a sampling rate of $4 \times f_{sc}$ (where $f_{sc}$ is the frequency of the color subcarrier), each horizontal line interval contains 910 pixels (picture elements) of which 754 constitute the active horizontal line image information to be displayed.

Returning to FIG. 1, a widescreen camera 10 provides a widescreen color signal with R, G, B components and a wide aspect ratio of 5:3 in this example. A widescreen camera is essentially identical to a standard NTSC camera except that a widescreen camera has a greater aspect ratio and a greater video bandwidth. The video bandwidth of a widescreen camera is proportional to the product of its aspect ratio and the total number of lines per frame, among other factors. Assuming constant velocity scanning by the widescreen camera, an increase in its aspect ratio causes a corresponding increase in its video bandwidth as well as horizontal compression of picture information when the signal is displayed by a standard television receiver with a 4:3 aspect ratio. For these reasons, it is necessary to modify the widescreen signal for full NTSC compatibility.

The color video signal processed by the encoder system of FIG. 1 contains both luminance and chrominance signal components. The luminance and chrominance signals contain both low and high frequency information, which in the following discussion will be referred to as "lows" and "highs", respectively.

The wide bandwidth widescreen color video signals from camera 10 are matrixed in a unit 12 to derive luminance component Y and color difference signal components I and Q from the R, G, B color signals. The wideband Y, I, Q signals are sampled at a four-times chrominance subcarrier rate ($4 \times f_{sc}$) and are converted from analog to digital (binary) form individually by separate analog-to-digital converters (ADC) in an ADC unit 14 before being filtered individually by separate horizontal low pass filters in a filter unit 16 to produce filtered signals YF, IF and QF. These signals are each of the form indicated by waveform A in FIG. 2. Luminance signal YF is bandwidth limited by filter 16 to CEF×4.2 MHz, or approximately 5 MHz, where CEF is the center panel expansion factor. This is necessary so that, after subsequent time expansion as will be discussed, the bandwidth of the center panel signal is reduced to 4.2 MHz, the bandwidth of an NTSC video signal. For a similar reason, signals IF and QF are bandwidth limited by filter 16 to CEF×500 KHz, or approximately 600 KHz. Filter unit 16 therefore exhibits a luminance cutoff frequency of approximately 5.0 MHz, and an I and Q cutoff frequency of approximately 600 KHz.

The bandwidths of the Y, I and Q filters of unit 16 are related to the center panel expansion factor, which in turn is a function of the difference between the width of an image displayed by a widescreen receiver and the width of an image displayed by a standard receiver. The image width of a widescreen display with a 5:3 aspect ratio is 1.25 times greater than the image width of a standard display with a 4:3 aspect ratio. This factor of 1.25 is a preliminary center panel expansion factor which must be adjusted to account for the overscan region of a standard receiver, and to account for an intentional slight overlap of the boundary regions between the center and side panels as will be explained. These considerations dictate a CEF of 1.19.

The wideband signals from filter unit 16 are processed by a side-center panel signal separator and processor 18 to produce three groups of output signals: YE, IE and QE; YO, IO and QO; and LH, RH, IH and QH. The first two groups of signals (YE, IE, QE and YO, IO, QO) are processed in a first channel which develops a signal containing a full bandwidth center panel component, and side panel luminance lows compressed into horizontal overscan regions. The third group of signals (LH, RH, IH, QH) is processed in a second channel which develops a signal containing side panel highs. When the output signals from the two channels are combined, an NTSC compatible widescreen signal with a 4:3 display aspect ratio is produced. Details of circuits comprising unit 18 will be shown and discussed in connection with FIGS. 6, 7 and 8.

Figure 3:
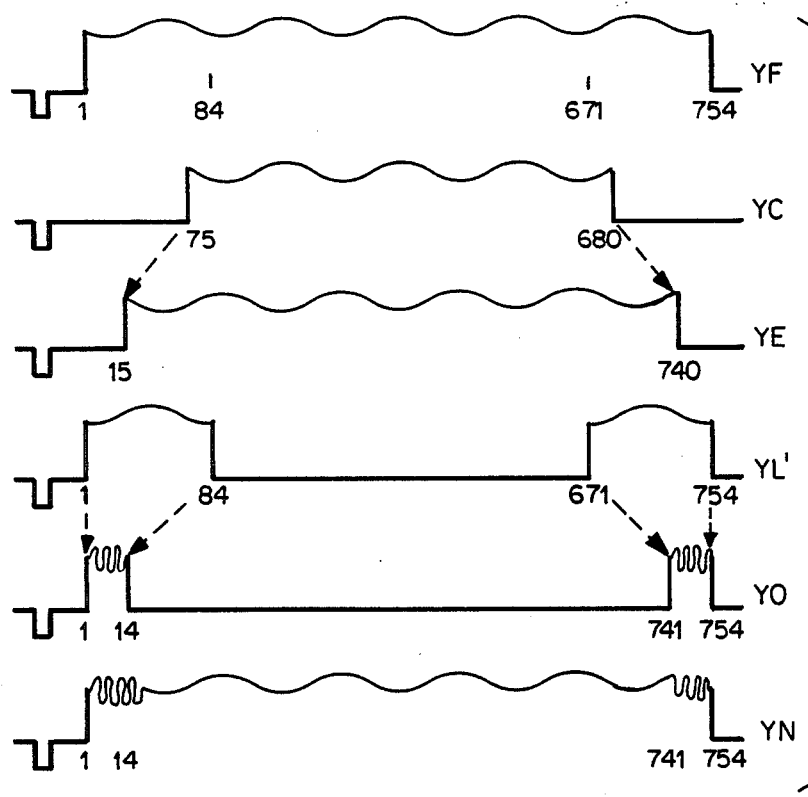

Signals YE, IE and QE contain complete center panel information and exhibit the same format, as indicated by signal YE in FIG. 3. Briefly, signal YE is derived from signal YF as follows. Widescreen wideband signal YF from unit 16 contains pixels 1–754 occuring during the active line interval of the widescreen signal, containing side and center panel information. The wideband center panel information (pixels 75–680) is extracted as a center panel luminance signal YC via a time de-multiplexing process. Signal YC is time expanded by the center panel expansion factor of 1.19 (i.e., 5.0 MHz÷4.2 MHz) to produce NTSC compatible center panel signal YE. Signal YE exhibits an NTSC compatible bandwidth (0–4.2 MHz) due to the time expansion by factor 1.19. Signal YE occupies picture display interval TD (FIG. 2) between overscan regions TO (pixels 1–14 and 741–754). Signals IE and QE are developed from signals IF and QF, respectively, and are similarly processed in the manner of signal YE.

Signals YO, IO and QO provide the low frequency side panel information ("lows") which is inserted into the left and right horizontal overscan regions. Signals YO, IO and QO exhibit the same format, as indicated by signal YO in FIG. 3. Briefly, signal YO is derived from signal YF as follows. Widescreen signal YF contains left panel information associated with pixels 1–84 and right panel information associated with pixels 671–754. As will be discussed, signal YF is low pass filtered to produce a luminance lows signal with a 0–700 KHz bandwidth, from which signal a left and right side panel lows signal is extracted (signal YL' in FIG. 3) via a time de-multiplexing process. Luminance lows signal YL' is time compressed to produce side panel lows signal YO with compressed low frequency information in the overscan regions associated with pixels 1–14 and 741–754. The compressed side lows signal exhibits an increased BW proportional to the amount of time compression. Signals IO and QO are developed from signals IF and QF respectively, and are similarly processed in the manner of signal YO.

Signals YE, IE, QE and YO, IO, QO are combined by a side-center signal combiner 28, e.g. a time multiplexer, to produce signals YN, IN and QN with an NTSC compatible bandwidth and a 4:3 aspect ratio. These signals are of the form of signal YN shown in FIG. 3. Combiner 28 also includes appropriate signal delays for equalizing the transit times of the signals being combined. Such equalizing signal delays are also included elsewhere in the system as required to equalize signal transit times.

Chrominance signals IN and QN are quadrature modulated on a subcarrier SC at the NTSC chrominance subcarrier frequency, nominally 3.58 MHz, by a modulator 30. The modulated signal is lowpass filtered in the vertical (V) and temporal (T) dimensions by means of a 2-D (two dimensional) filter 32 before being applied to a chrominance signal input of an NTSC encoder 36, as will be described in connection with FIG. 9. Luminance signal YN is bandstop filtered in the horizontal (H), vertical (V) and temporal (T) dimensions by means of a 3-D (three dimensional) filter 34 before being applied to a luminance input of encoder 36. Filtering luminance signal YN and chrominance color difference signals IN and QN serves to assure that luminance-chrominance crosstalk will be significantly reduced after subsequent NTSC encoding. Luminance filter 34 also bandstop filters the luminance signal in the spectral region where the luminance side panel highs will be modulated, as will be discussed.

Multi-dimensional spatial-temporal filters such as 3-D HVT filter 34 and 2-D VT filters 32 and 46 comprise structure as illustrated by FIG. 10. Specifically, FIG. 10 illustrates a vertical-temporal (VT) filter which can exhibit VT bandpass, VT bandstop or VT low pass configurations by adjusting weighting coefficients a1–a9. The table of FIG. 10a illustrates the weighting coefficients associated with VT bandpass and bandstop filter configurations which are employed in the disclosed system. An HVT bandstop filter such as filter 34 of FIG. 1, and HVT bandpass filters such as are included in the decoder system of FIG. 13, respectively comprise the combination of a horizontal lowpass filter 1020 and a VT bandstop filter 1021 as shown in FIG. 10b, and the combination of a horizontal bandpass filter 1030 and a VT bandpass filter 1031 as shown in FIG. 10c.

In the HVT bandstop filter of FIG. 10b, horizontal lowpass filter 1020 exhibits a given cut-off frequency and provides a filtered low frequency signal component. This signal is subtractively combined in a combiner 1023 with a delayed version of the input signal from a delay unit 1022 to produce a high frequency signal component. The low frequency component is subjected to a one frame delay by means of a network 1024 before being applied to an additive combiner 1025, and the high frequency component is filtered by a VT bandstop filter 1021 before being applied to adder 1025 for providing an HVT bandstop filtered output signal. VT filter 1021 exhibits the VT bandstop filter coefficients shown in FIG. 10a. An HVT bandpass filter such as included in the decoder of FIG. 13 is shown in FIG. 10c as comprising a horizontal bandpass filter 1030 having a given cut-off frequency, cascaded with a VT bandpass filter 1031 having VT bandpass filter coefficients as indicated by the table of FIG. 10a.

The filter of FIG. 10 includes a plurality of cascaded memory units (M) 1010a–1010h for providing successive signal delays at respective taps t1–t9, and for providing an overall filter delay. Signals conveyed by the taps are respectively applied to one input of multipliers 1012a–1012i. Another input of each of the multipliers respectively receives a prescribed weighting coefficient a1–a9 depending on the nature of the filtering process to be performed. The nature of the filtering process also dictates the delays imparted by memory units 1010a–1010h. Horizontal dimension filters employ pixel storage memory elements such that the overall filter delay is less than the time interval of one horizontal image line (1H). Vertical dimension filters employ line storage memory elements exclusively, and temporal dimension filters employ frame storage memory elements exclusively. Thus an HVT 3-D filter comprises a combination of pixel, (<1H), line (1H) and frame (>1H) storage elements, while a VT filter comprises only the latter two types of memory elements. Weighted tapped (mutually delayed) signals from elements 1012a–1012i are combined in an adder 1015 to produce a filtered output signal.

Such filters are non-recursive, finite impulse response (FIR) filters. The nature of the delay provided by the memory elements depends on the type of signal being filtered and the amount of crosstalk that can be tolerated between the luminance, chrominance and side panel highs signals in this example. The sharpness of the filter cutoff characteristics is enhanced by increasing the number of cascaded memory elements.

HVT bandstop filter 34 in FIG. 1 exhibits the configuration of FIG. 10b, and removes upwardly moving diagonal frequency components from luminance signal YN. These frequency components are similar in appearance to chrominance subcarrier components and are removed to make a hole in the frequency spectrum into which modulated chrominance side panel highs and luminance side panel highs will be inserted. The removal of the upwardly moving diagonal frequency components from luminance signal YN does not visibly degrade a displayed picture because it has been determined that the human eye is substantially insensitive to these frequency components. Filter 34 exhibits a cut-off frequency of approximately 1.5 MHZ so as not to impair luminance vertical detail information.

VT bandpass filter 32 reduces the chrominance bandwidth so that modulated chrominance side panel information can be inserted into the hole created in the luminance spectrum by filter 34. Filter 32 reduces the vertical and temporal resolution of chrominance information such that static and moving edges are slightly blurred, but this effect is of little or no consequence due to the insensitivity of the human eye to such effect.

An output signal C/SL from encoder 36 contains NTSC compatible information to be displayed, as derived from the center panel of the widescreen signal, as well as compressed side panel lows (both luminance and chrominance) derived from the side panels of the widescreen signal and situated in the left and right horizontal overscan regions not seen by a viewer of an NTSC receiver display. The compressed side panel lows in the overscan region represent one constituent part of the side panel information for a widescreen display. The other constituent part, the side panel highs, is developed as follows.

Figure 4:
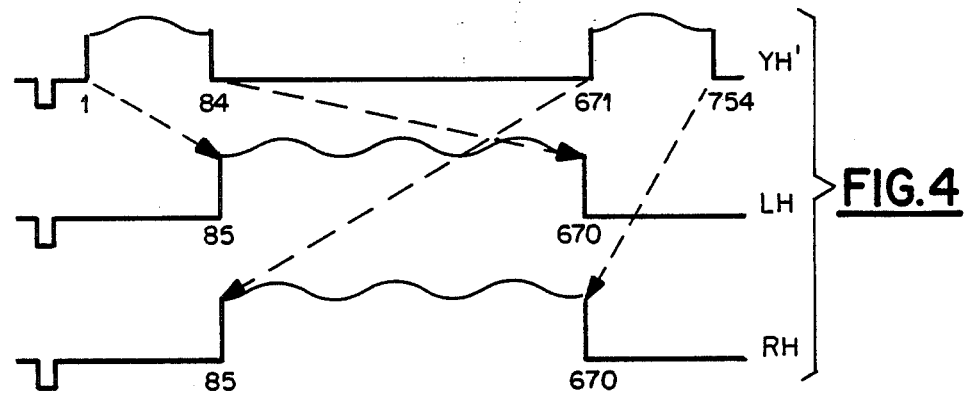
Figure 5:
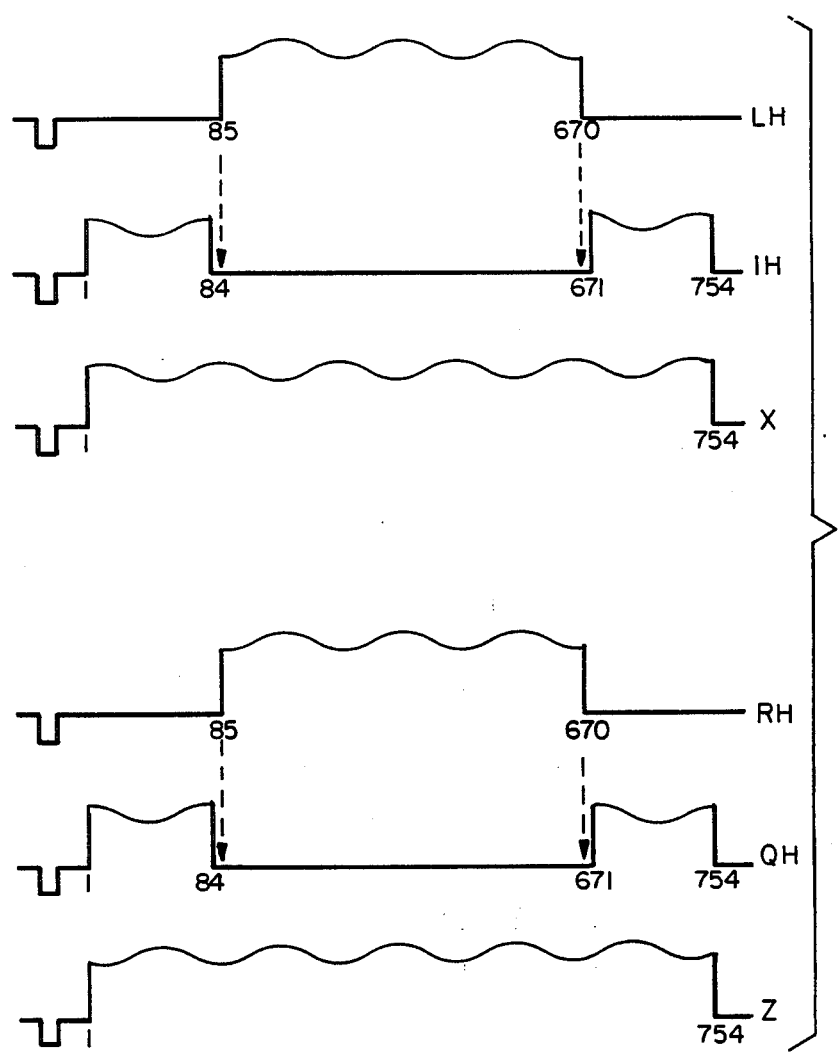
Figure 6:
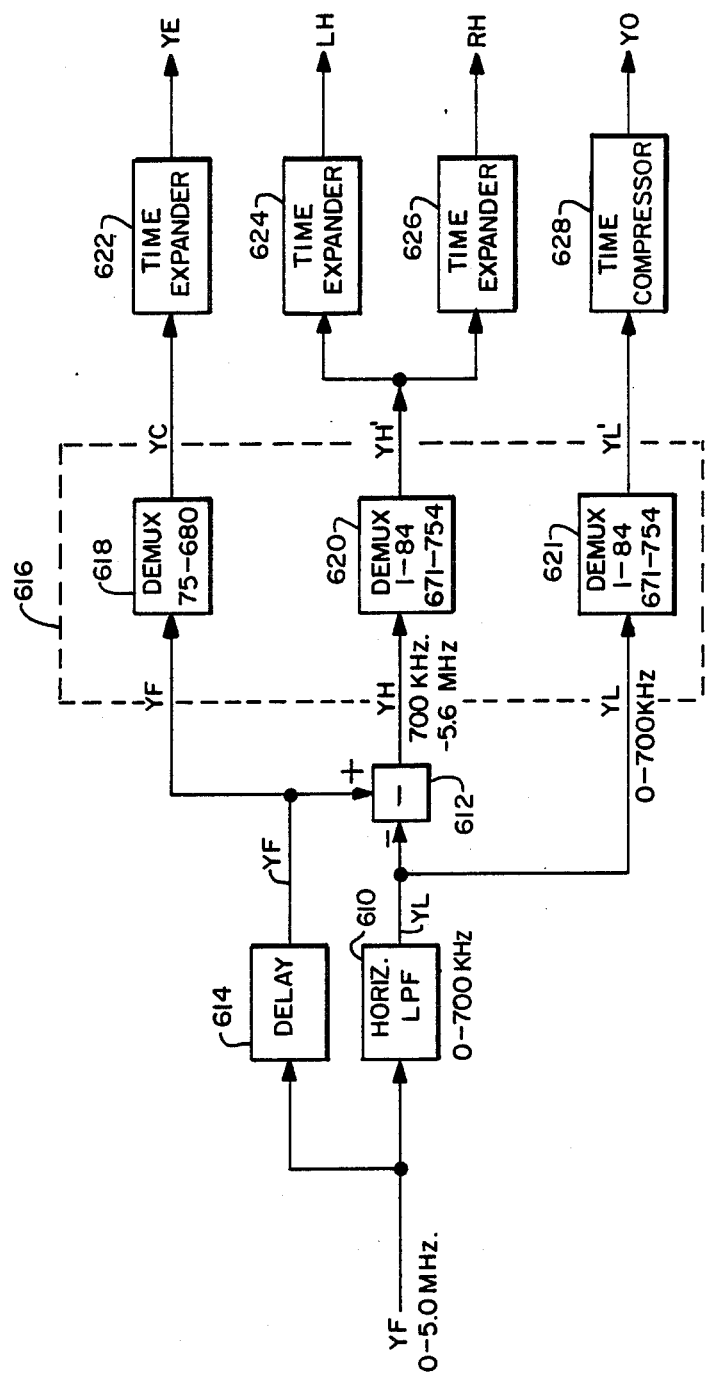
Figure 7:
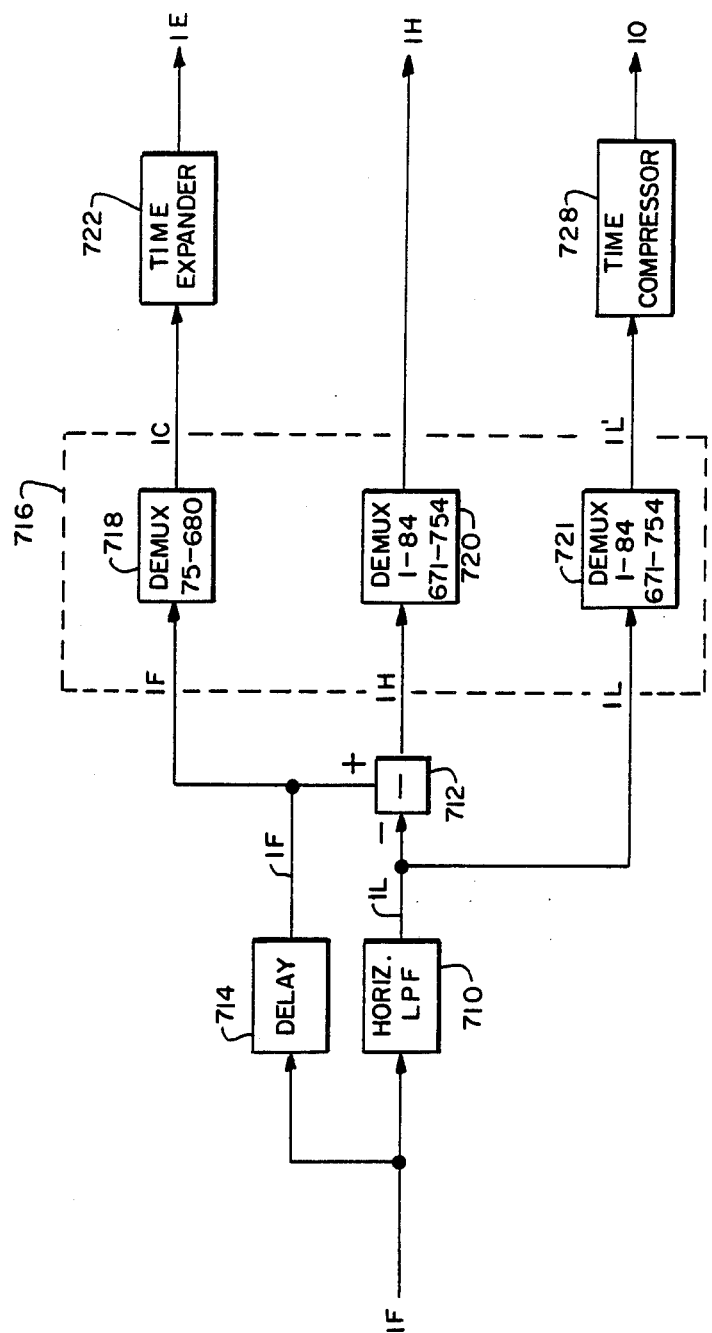
Figure 8:
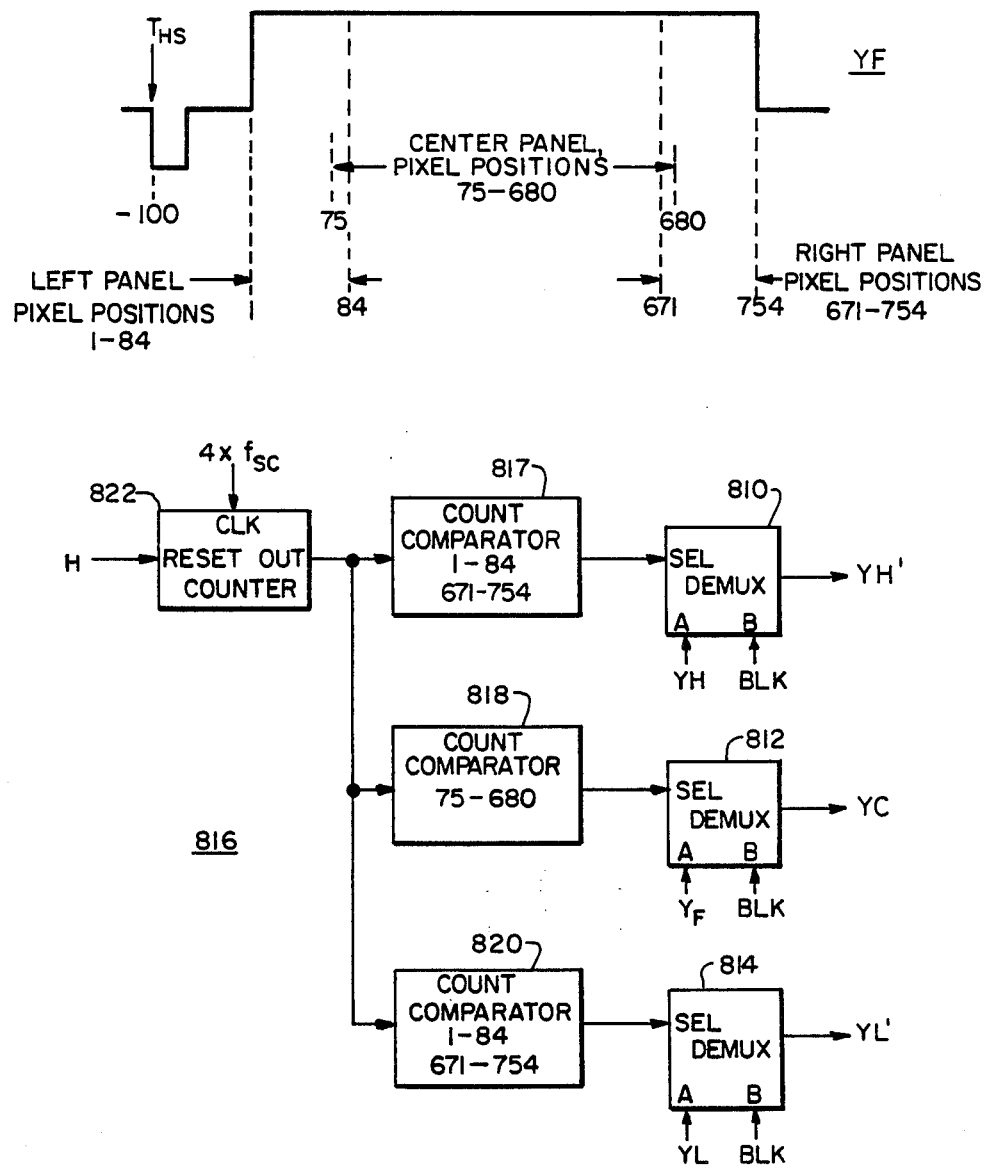

Processor 18 develops signals LH (left side panel luminance highs), RH (right side panel luminance highs), IH (I highs) and QH (Q highs) in the side panel highs signal processing channel. These signals are illustrated by FIGS. 4 and 5. FIGS. 6, 7 and 8 illustrate apparatus for developing these signals.

In FIG. 4, a signal YH′, derived from widescreen signal YF, contains left panel high frequency information associated with left panel pixels 1–84, and right panel high frequency information associated with right panel pixels 671–754. The high frequency information encompasses a bandwidth of from 700 KHz to 5.0 MHz in this example. For each horizontal line, the left side panel highs component between pixels 1–84 of signal YH' is time expanded by a side expansion factor (thereby reducing its bandwidth accordingly) and is mapped into the center panel location occupied by pixels 85–670 to produce one component LH (FIG. 4) of the side panel information. Simultaneously, for each horizontal line, the right side panel highs component between pixels 671–754 of signal YH' is also time expanded and mapped into the center panel location occupied by pixels 85–670 to produce another simultaneous component RH (FIG. 4) of the side panel information. Simultaneously occurring signals RH and LH each exhibit a reduced bandwidth due to the side panel expansion factor (6.96), which is the ratio of the expanded side panel width to the original side panel width.

Signals LH and RH are time multiplexed with signals IH and QH by a luminance-chrominance multiplexer 42, to simultaneously produce side panel highs signal components X and Z as illustrated by FIG. 5. Signal component X is produced by inserting left highs luminance component LH (pixels 85–670) between the left and right side panel highs of color difference signal IH. Similarly, signal component Z is simultaneously produced by inserting right highs luminance component RH (pixels 85–670) between the left and right side panel highs of color difference signal QH.

Signals X and Z, containing the side panel highs information, each exhibit a 0–700 KHz bandwidth and are quadrature modulated onto a horizontally synchronized alternate subcarrier signal ASC by means of a quadrature modulator 43. The frequency of alternate subcarrier signal ASC is chosen to insure adequate separation (e.g. 20–30 db) of side and center information, and to have insignificant impact upon an image displayed by a standard NTSC receiver. In this embodiment signal ASC exhibits a frequency of 2.368 MHz.

Figure 11:
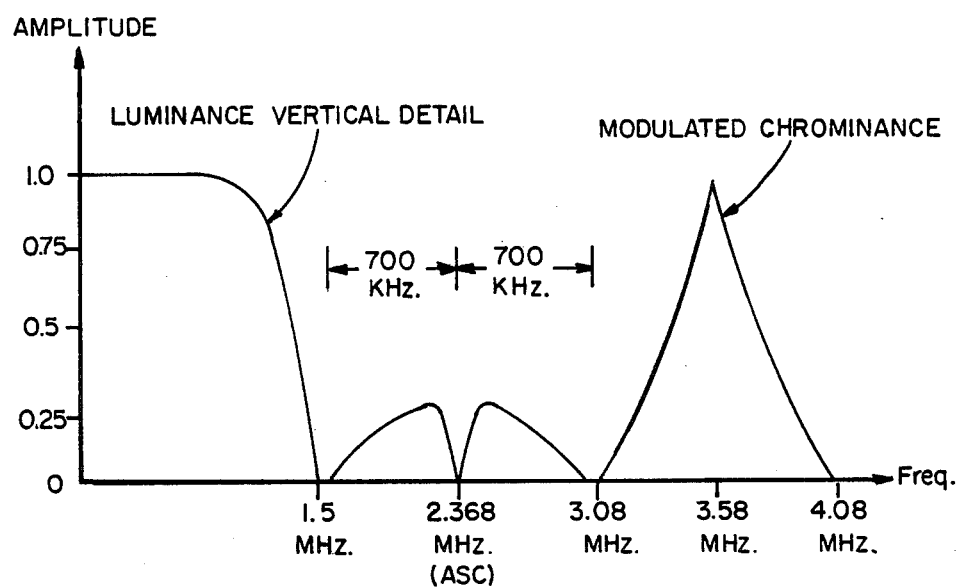
FIG. 11 depicts an amplitude versus frequency response characteristic associated with a feature of the system of FIG. 1.

The frequency of 2.368 MHz chosen for alternate subcarrier signal ASC is an interlace frequency at an odd multiple of one half of the horizontal line rate, i.e., $301 \times f_H/2$. This alternate subcarrier frequency produces a fine, virtually imperceptible cross-hatch interference pattern which does not compromise the quality of a displayed picture, compared to a more serious "moving stripes" interface pattern which would be produced by a non-interlace subcarrier frequency. The 2.368 MHz subcarrier frequency advantageously resides in the frequency spectrum substantially symmetrically between the luminance vertical detail band and the modulated chrominance band, as shown in FIG. 11. As a result, as seen from FIG. 11, the modulated side panel highs information occupies a ±700 KHz bandwidth between the vertical detail and chrominance frequency bands. For the purpose of simplifying this illustration, FIG. 11 does not show the actual overall luminance frequency spectrum, which extends to 4.2 MHz and is interleaved with the chrominance frequency spectrum as known.

Quadrature modulation advantageously permits two narrowband signals to be transmitted simultaneously. Expanding the side panel highs signals results in their bandwidth being reduced, consistent with the narrowband requirements of quadrature modulation. The more the bandwidth is reduced, the less likely it is that interference between the carrier and modulating signals will result. It is also noted that the described technique of time multiplexing the luminance and chrominance side panel highs to produce signals X and Z before quadrature modulation advantageously requires only one subcarrier rather than two. Furthermore, since the DC component of the side panel information is compressed into the overscan region, the energy of the modulating signal, and therefore the potential interference of the modulating signal, are greatly reduced.

To reduce the likelihood of interference produced by the quadrature modulated signal, the signal from modulator 43 is attenuated by attenuator 44, which exhibits a signal gain of 0.25, before being bandpass filtered along diagonal axes in the vertical-temporal (V-T) plane by bandpass filter 46. The action of attenuator 44 has been found to reduce the visibility of certain types of interference caused by uncorrelated modulated side highs when viewed on a standard NTSC receiver. The attenuation achieved by network 44 can also be produced by adjusting the weighting coefficients of filter 46. A filtered quadrature modulated output signal SH from filter 46, containing the side panel highs, is combined with signal C/SL in combiner 40 to produce a widescreen NTSC compatible signal NTSC. Signal NTSC is converted to analog form by a digital-to-analog converter (DAC) 54 before being applied to an RF modulator and transmitter network 55 for broadcast via an antenna 56.

The encoded NTSC compatible widescreen signal broadcast by antenna 56 is intended to be received by both NTSC receivers and widescreen receivers, as illustrated by FIG. 13. Before discussing FIG. 13, however, reference is made to FIGS. 6–9 and 12, which illustrate certain portions of the encoder system of FIG. 1 in more detail.

FIG. 6 illustrates apparatus included in processor 18 of FIG. 1 for developing signals YE, YO, LH and RH from wideband widescreen signal YF. Signal YF is horizontally low pass filtered by a filter 610 with a cutoff frequency of 700 KHz to produce low frequency luminance signal YL, which is applied to one input of a subtractive combiner 612. Signal YF is applied to another input of combiner 612 and to time de-multiplexing apparatus 616 after being delayed by a unit 614 to compensate for the signal processing delay of filter 610. Combining delayed signal YF and filtered signal YL produces high frequency luminance signal YH at the output of combiner 612.

Delayed signal YF and signals YH and YL are applied to separate inputs of de-multiplexing apparatus 616, which includes de-multiplexing (DEMUX) units 618, 620 and 621 for respectively processing signals YF, YH and YL. The details of de-multiplexing apparatus 616 will be discussed in connection with FIG. 8. De-multiplexing units 618, 620 and 621 respectively derive full bandwidth center panel signal YC, side panel highs signal YH' and side panel lows signal YL' as illustrated in FIGS. 3 and 4.

Signal YC is time expanded by a time expander 622 to produce signal YE, while time expanders 624 and 626 expand signal YH' to produce signals LH and RH, respectively. Signal YC is time expanded with a center expansion factor sufficient to leave room for the left and right horizontal overscan regions. The center expansion factor (1.19) is the ratio of the intended width of signal YE (pixels 15–740) to the width of signal YC (pixels 75–680) as shown in FIG. 3. Signal YH' is expanded with a side expansion factor to produce signal LH. The side expansion factor (6.97) is the ratio of the intended width of signal LH (pixels 85–670) to the width of the left panel component of signal YH' (pixels 1–84) as shown in FIG. 4. Signal RH is produced by a similar process.

Signal YL' is compressed with a side compression factor by a time compressor 628 to produce signal YO. The side compression factor (0.166) is the ratio of the intended width of signal YO (e.g. left pixels 1–14) to the width of the corresponding portion of signal YL' (e.g. left pixels 1–84) as shown in FIG. 3. Time expanders 622, 624 and 626 and time compressor 628 can be of the type shown in FIG. 12, as will be discussed.

Signals IE, IH, IO and QE, QH, QO are respectively developed from signals IF and QF in a manner similar to that by which signals YE, YH' and YO are developed by the apparatus of FIG. 6. In this regard reference is made to FIG. 7, which illustrates apparatus for developing signals IE, IH and IO from signal IF. Signals QE, QH and QO are developed from signal QF in a similar manner.

Wideband widescreen signal IF, after being delayed by a unit 714, is coupled to de-multiplexing apparatus 716 and is also subtractively combined with low frequency signal IL from a low pass filter 710 in a subtractive combiner 712 to produce high frequency signal IL. Delayed signal IF and signals IH and IL are respectively de-multiplexed by de-multiplexers 718, 720 and 721 associated with de-multiplexing apparatus 716 to produce signals IC, IH and IL'. Signal IC is time expanded by an expander 722 to produce signal IE, and signal IL' is time compressed by a compressor 72B to produce signal 10. Signal IC is expanded with a center expansion factor similar to that employed for signal YC as discussed, and signal IL' is compressed with a side compression factor similar to that employed for signal YL', also as discussed.

In connection with the arrangements of FIGS. 6 and 7 it is noted that, e.g. in FIG. 6, filtering of the input signal prior to, rather than after, being applied to de-multiplexer 616 advantageously avoids unwanted signal edge transients in output signals LH, RH and YO. Specifically, de-multiplexer 616 produces output signals with sharp, well defined output transitions which would be distorted (e.g. smeared) by filtering the output signals from de-multiplexer 616.

FIG. 8 illustrates a de-multiplexing apparatus 816 such as can be used for apparatus 616 of FIG. 6 and 716 of FIG. 7. The apparatus of FIG. 8 is illustrated in the context of de-multiplexer 616 of FIG. 6. Input signal YF contains 754 pixels defining the image information. Pixels 1–84 define the left panel, pixels 671–754 define the right panel, and pixels 75–680 define the center panel which overlaps the left and right panels slightly. Signals IF and QF exhibit similar overlap. As will be discussed, such panel overlap has been found to facilitate combining (splicing) the center and side panels at the receiver to substantially eliminate boundary artifacts.

De-multiplexing apparatus 816 includes first, second and third de-multiplexer (DEMUX) units 810, 812 and 814 respectively associated with left, center and right panel information. Each de-multiplexer unit has an input "A" to which signals YH, YF and YL are respectively applied, and an input "B" to which a blanking signal (BLK) is applied. The blanking signal may be a logic 0 level or ground, for example. Unit 810 extracts signal YH', containing the left and right highs, from signal YH as long as a signal select input (SEL) of unit 810 receives a first control signal from a count comparator 817 indicating the presence of left panel pixll elements 1–84 and right panel pixel elements 671–754. At other times, a second control signal from count comparator 817 causes the BLK signal at input B rather than signal YH at input A to be coupled to the output of unit 810. Unit 814 and a count comparator 820 operate in a similar fashion for deriving side panel lows signal YL' from signal YL. Unit 812 couples signal YF from its input A to its output to produce center panel signal YC only when a control signal from a count comparator 818 indicates the presence of center panel pixels 75–680.

Count comparators 817, 818 and 820 are synchronized to video signal YF by means of a pulse output signal from a counter 822 which responds to a clock signal at four times the chrominance subcarrier frequency ($4 \times f_{sc}$), and to a horizontal line synchronizing signal H derived from video signal YF. Each output pulse from counter 822 corresponds to a pixel position along a horizontal line. Counter 822 exhibits an initial offset of a $-100$ count corresponding to the 100 pixels from the beginning of the negative going horizontal sync pulse at time $T_{HS}$ to the end of the horizontal blanking interval, at which time pixel 1 appears at the onset of the horizontal line display interval. Thus counter 822 exhibits a count of "1" at the onset of the line display interval. Other counter arrangements can also be developed. It should be apparent that the principles employed by de-multiplexing apparatus 816 can also be applied to multiplexing apparatus for performing a converse signal combining operation, such as is performed by side-center panel combiner 28 in FIG. 1.

Figure 9:
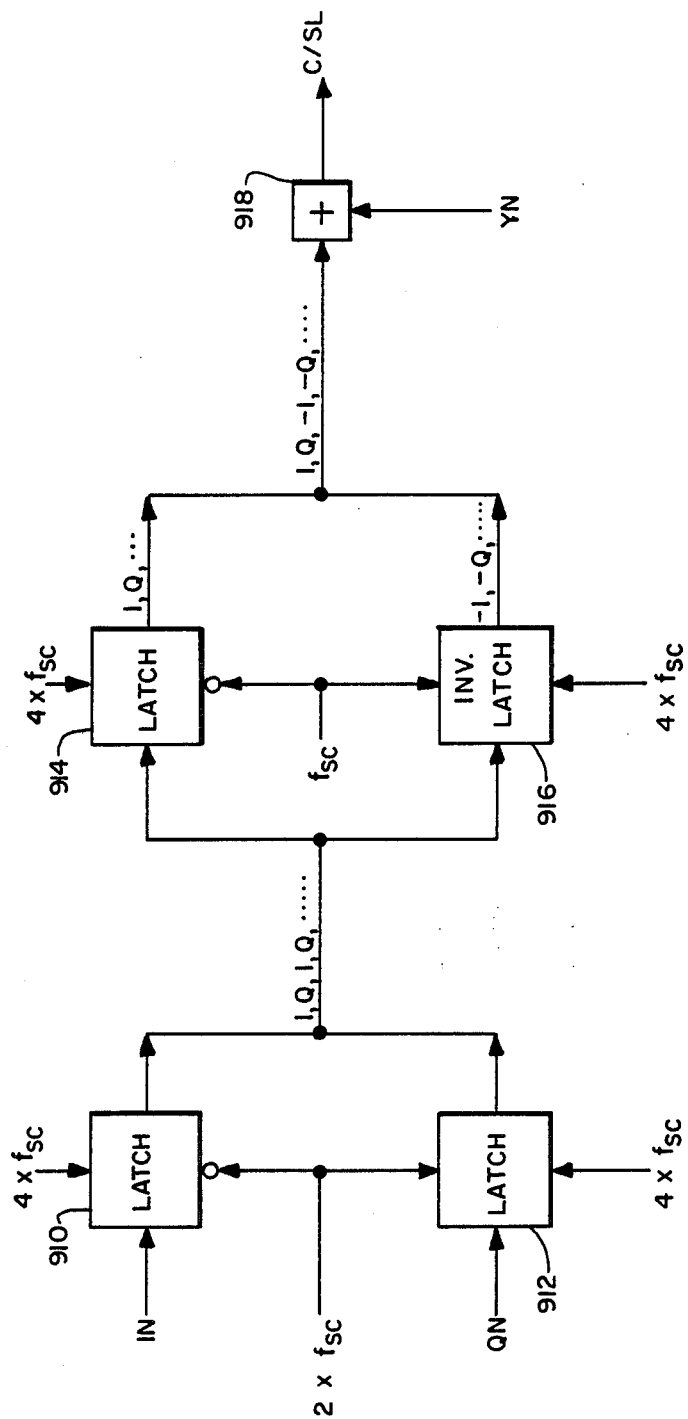

FIG. 9 shows apparatus suitable for performing the NTSC encoding process used in encoder 36 of FIG. 1 to produce signal C/SL.

In FIG. 9, signals IN and QN appear at a four times chrominance subcarrier rate ($4 \times f_{sc}$) and are applied to signal inputs of latches 910 and 912, respectively. Latches 910 and 912 also receive $4 \times f_{sc}$ clock signals to transfer in signals IN and QN, and a $2 \times f_{sc}$ switching signal which is applied to an inverting switching signal input of latch 910 and to a noninverting switching signal input of latch 912. Signal outputs of latches 910 and 912 are combined into a single output line at which signals I and Q appear alternately and are applied to signal inputs of a noninverting latch 914 and an inverting latch 916. These latches are clocked at a $4 \times f_{sc}$ rate and receive a switching signal, at the chrominance subcarrier frequency $f_{sc}$, at inverting and noninverting inputs respectively. Noninverting latch 914 produces an output alternating sequence of positive polarity signals I and Q, and inverting latch 916 produces an output alternating sequence of negative polarity I and Q signals, i.e. $-I$, $-Q$. The outputs of latches 914 and 916 are combined in a single output line on which appears an alternating sequence of paired I and Q signals of mutually opposite polarity pairs, i.e., I, Q, $-I$, $-Q$ ... etc. These signals are combined with luminance signal YN in an adder 918 to produce NTSC encoded signal C/SL of the form $Y+I$, $Y+Q$, $Y-I$, $Y-Q$, $Y+I$, $Y+Q$ ... and so on.

Figure 12:
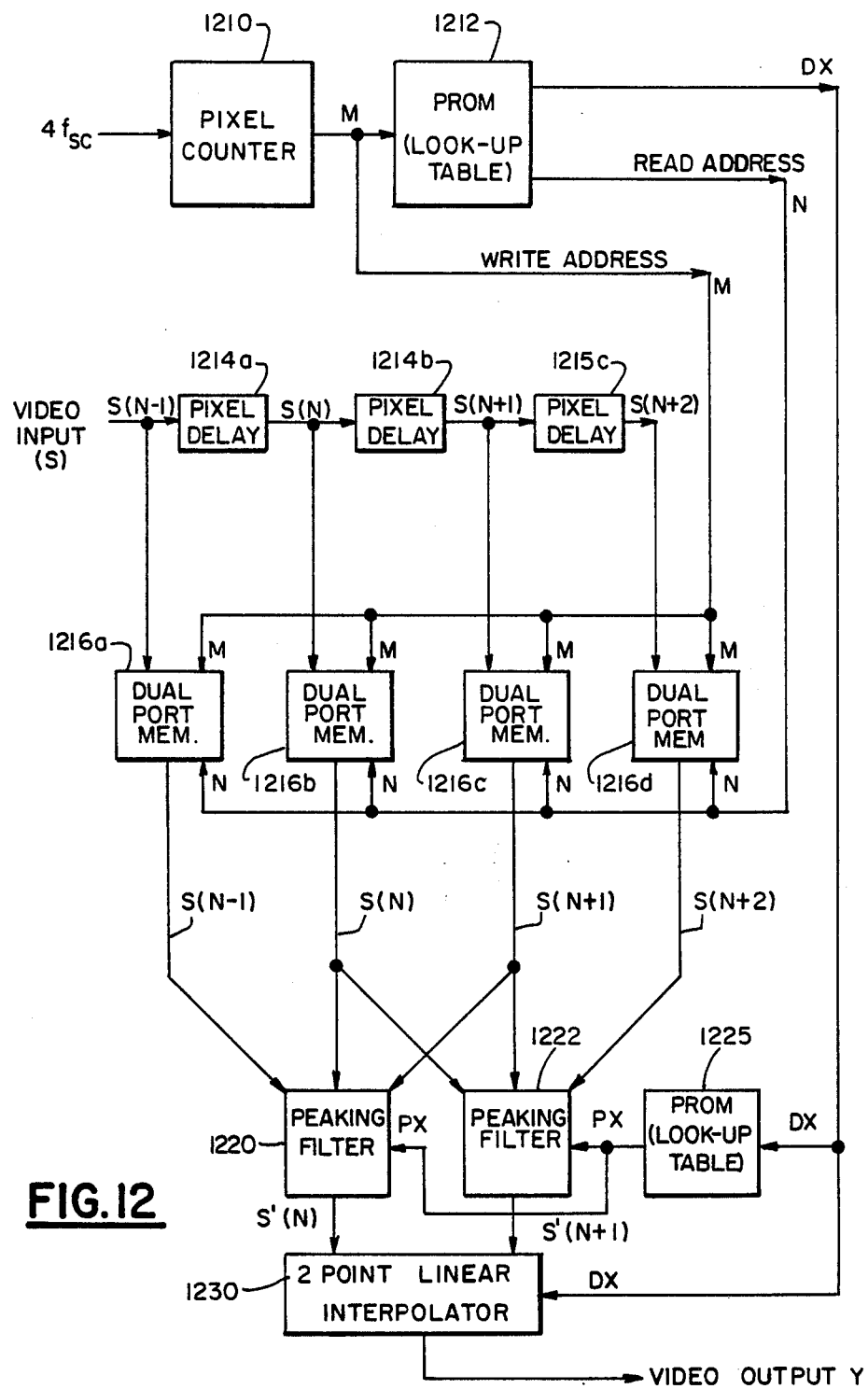
Figure 12A:
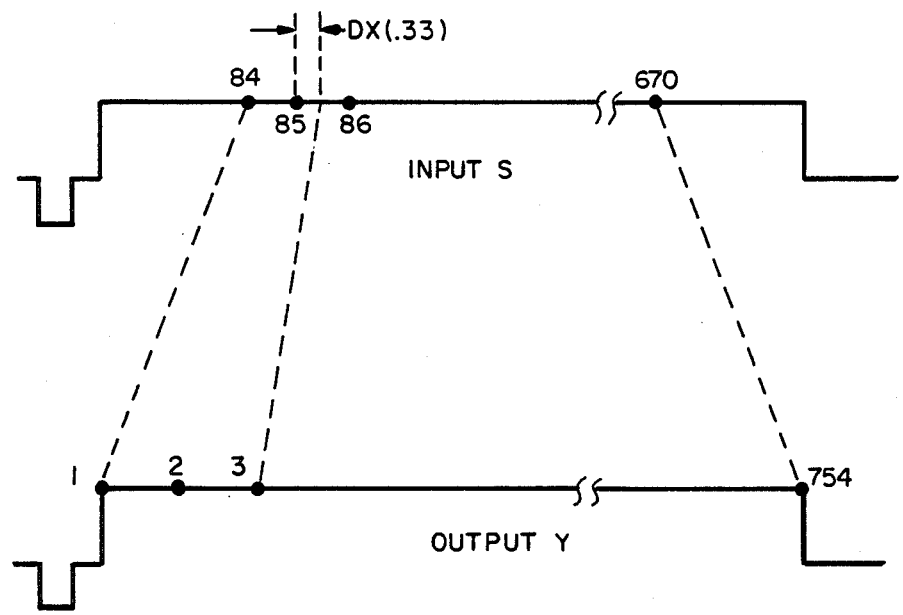

FIG. 12 illustrates raster mapping apparatus which can be used for the time expanders and compressors of FIGS. 6 and 7. In this regard, reference is made to the waveforms of FIG. 12a which illustrates the mapping process. FIG. 12a shows an input signal waveform S with a center portion between pixels 84 and 670 which is intended to be mapped into pixel locations 1–754 of an output waveform Y by means of a time expansion process. End point pixels 1 and 670 of waveform S map directly into end point pixels 1 and 754 of waveform Y. Intermediate pixels do not map directly on a 1:1 basis due to the time expansion, and in many cases do not map on an integer basis. The latter case is illustrated wherein, for example, pixel location 85.33 of input waveform S corresponds to integer pixel location 3 of output waveform Y. Thus pixel location 85.33 of signal S contains an integer part (85) and a fractional part DX (.33), and pixel location 3 of waveform Y contains an integer part (3) and a fractional part (0).

In FIG. 12, a pixel counter operating at a $4 \times f_{sc}$ rate provides an output WRITE ADDRESS signal M representative of pixel locations (1 . . . 754) on an output raster. Signal M is applied to PROM (Programmable Read Only Memory) 1212 which includes a look-up table containing programmed values depending upon the nature of raster mapping to be performed, e.g., compression or expansion. In response to signal M PROM 1212 provides an output READ ADDRESS signal N representing an integer number, and an output signal DX representing a fractional number equal to or greater than zero but less than unity. In the case of a 6-bit signal DX ($2^6=64$), signal DX exhibits fractional parts 0, 1/64, 2/64, 3/64 . . . 63/64.

PROM 1212 permits expansion or compression of a video input signal S as a function of stored values of signal N. Thus a programmed value of READ ADDRESS signal N and a programmed value of fractional part signal DX are provided in response to integer values of pixel location signal M. To achieve signal expansion, for example, PROM 1212 is arranged to produce signal N at a rate slower than that of signal M. Conversely, to achieve signal compression, PROM 1212 provides signal N at a rate greater than that of signal M.

Video input signal S is delayed by cascaded pixel delay elements 1214a, 1214b and 1214c to produce video signals S(N+2), S(N+1) and S(N) which are mutually delayed versions of the video input signal. These signals are applied to video signal inputs of respective dual port memories 1216a-1216d, as are known. Signal M is applied to a write address input of each of memories 1216a-1216d, and signal N is applied to a read address input of each of memories 1216a-1216d. Signal M determines where incoming video signal information will be written into the memories, and signal N determines which values will be read out of the memories. The memories can write into one address while simultaneously reading out of another address. Output signals S(N−1), S(N), S(N+1) and S(N+2) from memories 1216a-1216d exhibit a time expanded or time compressed format depending upon the read/write operation of memories 1216a-1216d, which is a function of how PROM 1212 is programmed.

Figure 12B:
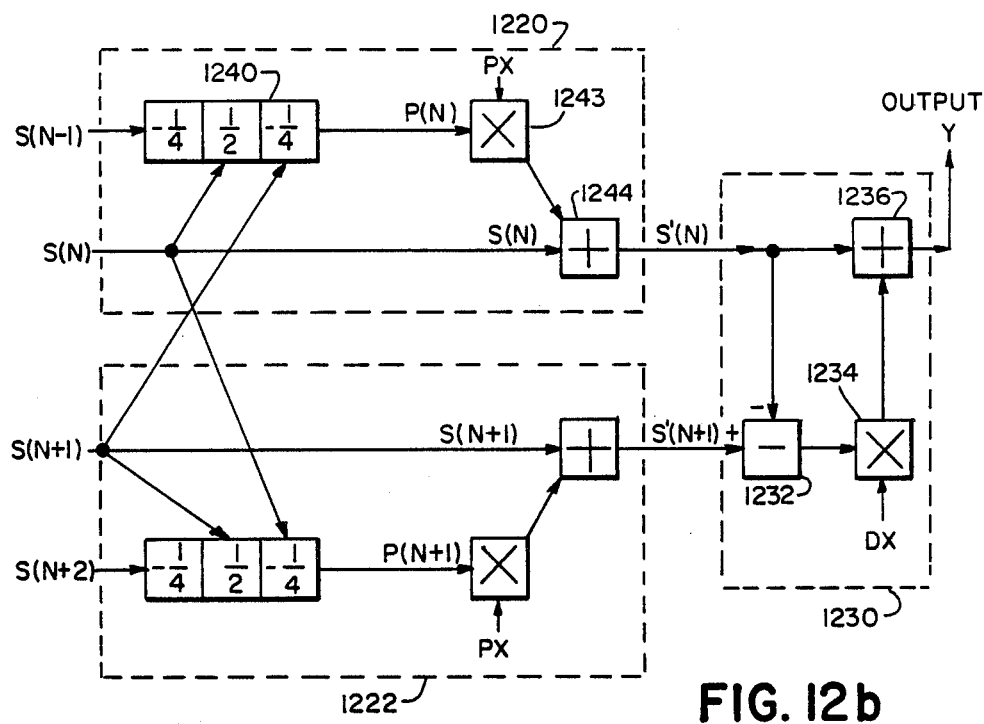
Figure 12C:
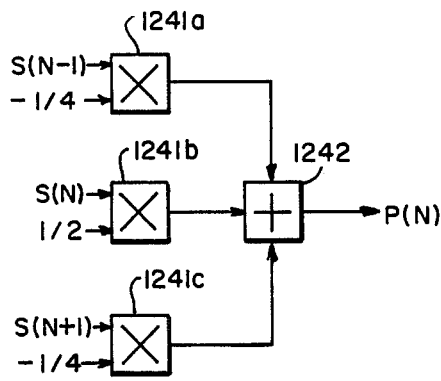
Figure 12D:
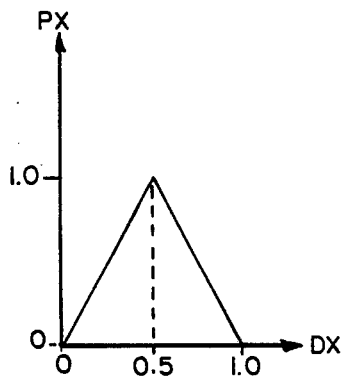

Signals S(N−1), S(N), S(N+1) and S(N+2) from memories 1216a-1216d are processed by a four-point linear interpolator including peaking filters 1220 and 1222, a PROM 1225 and a two point linear interpolator 1230, details of which are shown in FIGS. 12b and 12c. Peaking filters 1220 and 1222 receive three signals from the group of signals including signals S(N−1), S(N), S(N+1) and S(N+2), as shown, as well as receiving a peaking signal PX. The value of peaking signal PX varies from zero to unity as a function of the value of signal DX, as shown in FIG. 12d, and is provided by PROM 1225 in response to signal DX. PROM 1225 includes a look-up table and is programmed to produce a given value of PX in response to a give value of DX.

Peaking filters 1220 and 1222 respectively provide peaked mutually delayed video signals S'(N) and S'(N+1) to two-point linear interpolator 1230 which also receives signal DX. Interpolator 1230 provides a (compressed or expanded) video output signal Y, where output signal Y is defined by the expression $$Y = S'(N) + DX\,[S'(N+1) - S'(N)]$$

The described four-point interpolator and peaking function advantageously approximates a (sin X)/X interpolation function with good resolution of high frequency detail.

FIG. 12b shows details of peaking filters 1220 and 1222, and interpolator 1230. In FIG. 12b, signals S(N−1), S(N) and S(N+1) are applied to a weighting circuit 1240 where these signals are respectively weighted by peaking coefficients $-\frac{1}{4}$, $\frac{1}{2}$ and $-\frac{1}{4}$. As shown in FIG. 12c, weighting circuit 1240 comprises multipliers 1241a-1241c for respectively multiplying signals S(N−1), S(N) and S(N+1) with peaking coefficients $-\frac{1}{4}$, $\frac{1}{2}$ and $-\frac{1}{4}$. Output signals from multipliers 1241a-1241c are summed in an adder 1242 to produce a peaked signal P(N), which is multiplied by signal PX to produce a peaked signal which is summed with signal S(N) to produce peaked signal S'(N). Peaking filter 1222 exhibits similar structure and operation.

In two point interpolator 1230, signals S'(N) is subtracted from S'(N+1) in a subtractor 1232 to produce a difference signal which is multiplied by signal DX in a multiplier 1234. The output signal from multiplier 1234 is summed with signal S'(N) in an adder 1236 to produce output signal Y.

Referring now to FIG. 13, a broadcast compatible widescreen television signal is received by an antenna 1310 and applied to an antenna input of an NTSC receiver 1312. Receiver 1312 processes the compatible widescreen signal in normal fashion to produce an image display with a 4:3 aspect ratio, with the widescreen sidepanel information being in part compressed (i.e., "lows") into the horizontal overscan regions out of sight of the viewer, and being in part (i.e., "highs") contained in the modulated alternate subcarrier signal which does not disrupt the standard receiver operation.

The compatible widescreen signal received by antenna 1310 is also applied to a widescreen receiver 1320 capable of displaying a video image with a wide aspect ratio of, e.g., 5:3. The received widescreen signal is processed by an input unit 1322 including radio frequency (RF) tuner and amplifier circuits, and a video demodulator which produces a baseband video signal. The baseband video signal from unit 1322 is converted to digital (binary) form by means of an analog-to-digital converter (ADC) 1324 which operates at a sampling rate of four times the chrominance subcarrier frequency ($4 \times f_{sc}$).

A wideband analog video signal from an output of ADC 1324 is applied to an HVT bandpass filter 1326 for extracting the side panel highs signal (SH). Filter 1326 exhibits the configuration of FIG. 10c and has a passband of 2.368 MHz±700 KHz. The side panel highs signal is applied to one input of a subtractive combiner 1328, another input of which receives the wideband video output signal from ADC 1324 after being delayed by a unit 1330 to compensate for the signal processing delay associated with filter 1326. An output NTSC format signal C/SL from combiner 1328 contains full bandwidth center panel information as well as the compressed side panel lows. Signal C/SL corresponds to signal C/SL from the output of encoder 36 in FIG. 1. In the remaining discussion of FIG. 13, signals having counterparts to signals shown in FIG. 1 are identified by the same label.

Signal C/SL is decoded into its constituent YN, IN and QN components by means of a decoder arrangement including an HVT bandpass filter 1332, which exhibits the configuration of FIG. 10c and has a passband of 3.58±0.5 MHz, a subtractive combiner 1334 and a synchronous quadrature demodulator 1336 responsive to alternate subcarrier signal ASC. Filter 1332 separates the chrominance component from signal C/SL. Luminance signal YN is obtained by subtracting the separated chrominance output signal of filter 1332 from signal C/SL in subtractive combiner 1334, after signal C/SL is delayed by a network 1333 to equalize the transit times of the signals applied to combiner 1334. The separated chrominance signal from filter 1332 is also quadrature demodulated by demodulator 1336 to produce color difference signal components IN and QN. Signals YN, IN and QN are separated into compressed side panel lows YO, IO, QO and expanded center panel signals YE, IE, QE by means of a side-center panel signal separator (time de-multiplexer) 1340. Demuliplexer 1340 can employ the principles of demultiplexer 816 of FIG. 8 discussed previously.

Signals YO, IO and QO are time expanded by a side expansion factor (corresponding to the side compression factor in the encoder of FIG. 1) by means of a time expander 1342 to restore the original spatial relationship of the side panel lows in the widescreen signal, as represented by restored side panel lows signals YL, IL and QL. Similarly, to make room for the side panels, signals YE, IE and QE are time compressed by a center compression factor (corresponding to the center expansion factor in the encoder of FIG. 1) by means of a time compressor 1344 to restore the original spatial relationship of the center panel signal in the widescreen signal, as represented by restored center panel signals YC, IC and QC. Compressor 1344 and expander 1342 can be of the type shown in FIG. 12. The restored side panel lows YL, IL and QL are combined in a combiner 1346 with restored side panel highs YH, IH and QH which are recovered as follows.

Side highs signal SH from filter 1326 is amplified with a gain of 4 by an amplifier 1350, to compensate for the attenuation produced by attenuator 44 in the encoder of FIG. 1. The amplified side highs signal is quadrature demodulated by a demodulator 1352 which responds to alternate subcarrier signal ASC. Demodulated side highs signals X and Z are applied to a luminance-chrominance separator 1354, e.g., a de-multiplexer of the type shown in FIG. 8, for producing side highs luminance components LH, RH and color difference signal components IH, QH. Specifically, signal X is de-multiplexed to produce signals LH and IH, and signal Z is de-multiplexed to produce signals RH and QH, as illustrated by FIG. 5.

Left and right side panel highs signals LH and RH are time compressed by a side compression factor (corresponding to the side expansion factor in the encoder of FIG. 1) by means of a time compressor 1356. Compressor 1356 is of the type discussed in connection with FIG. 12, and also "maps" the left and right compressed side highs signals into proper position within each horizontal scanning line, thereby producing spatially restored side panel highs signal YH.

Spatially restored side panel highs YH, IH and QH are combined with spatially restored side panel lows YL, IL and QL by combiner 1346 to produce reconstructed side panel signals YS, IS and QS. These signals are spliced to reconstructed center panel signals YC, IC and QC by means of a splicer 1360 to form a fully reconstructed widescreen luminance signal YF and fully reconstructed widescreen color difference signals IF and QF. Splicing of the side and center panel signal components is accomplished in a manner which virtually eliminates a visible seam at the boundary between the center and side panels, as will be seen from the subsequent discussion of splicer 1360 as shown in FIG. 14.

Widescreen signals YF, IF and QF are converted to analog form by means of a digital-to-analog converter 1362 before being applied to a video signal processor and matrix amplifier unit 1364. The video signal processor component of unit 1364 includes signal amplifying, DC level shifting, peaking, brightness control, contrast control and other video signal processing circuits of a conventional nature. Matrix amplifier 1364 combines luminance signal YF with color difference signals IF and QF to produce color image representative video signals R, G and B. These color signals are amplified by display driver amplifiers in unit 1364 to a level suitable for directly driving a widescreen color image display device 1370, e.g. a widescreen kinescope.

Figure 14:
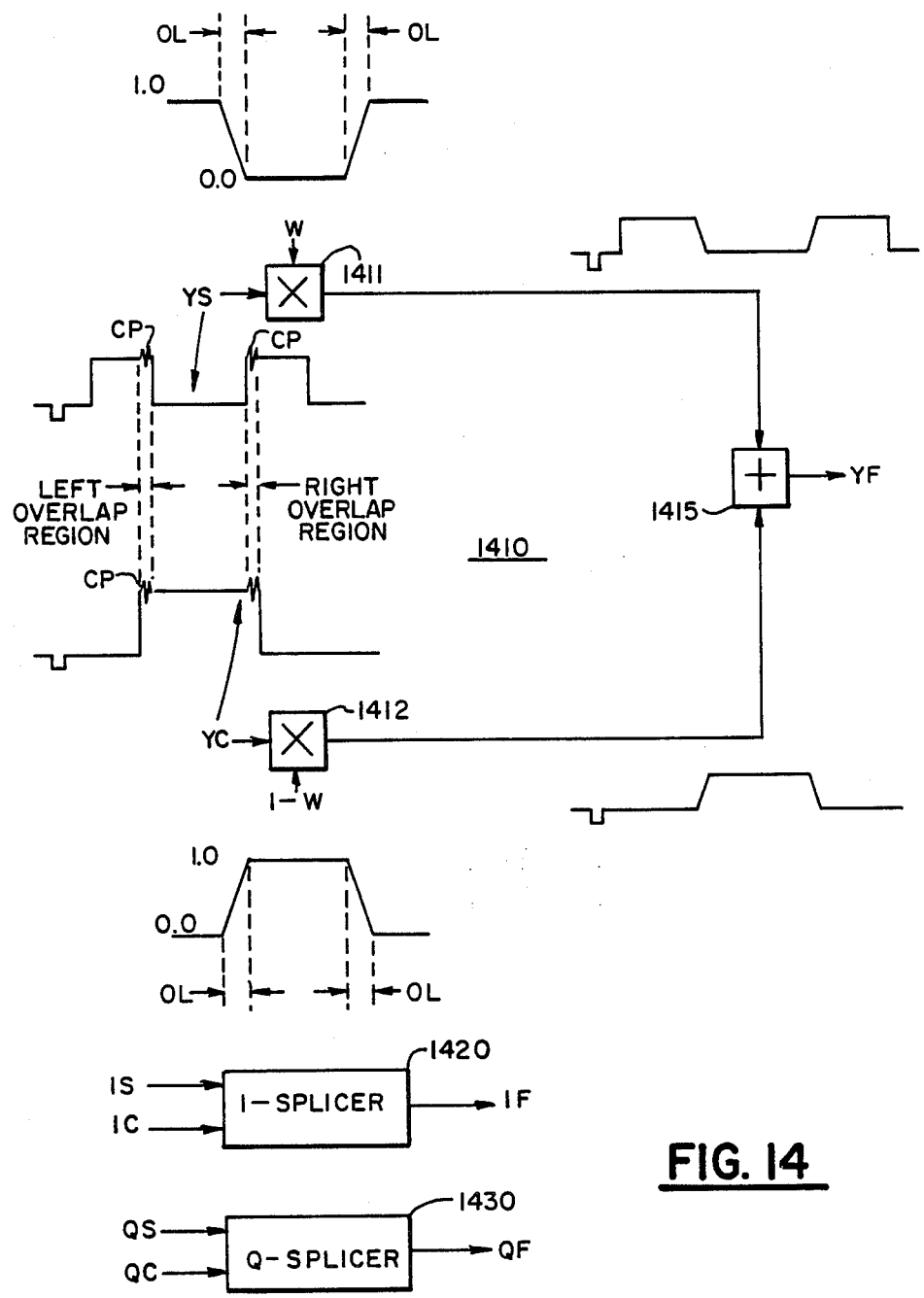
FIG. 14 shows a portion of the decoder of FIG. 13 in greater detail.

In FIG. 14, splicer 1360 is shown as comprising a network 1410 for producing full bandwidth luminance signal YF from side panel luminance signal component YS and center panel luminance signal component YC, as well as an I signal splicer 1420 and a Q signal splicer 1430 which are similar in structure and operation to network 1410. As mentioned previously, the center panel and the side panels are purposely overlapped by several pixels, e.g. ten pixels. Thus the center and side panel signals have shared several redundant pixels throughout the signal encoding and transmission process prior to splicing.

In the widescreen receiver, the center and side panels are reconstructed from their respective signals, but because of the time expansion, time compression and filtering performed on the panel signals, several pixels at the side and center panel boundaries are corrupted, or distorted. The overlap regions (OL) and corrupted pixels (CP) (slightly exaggerated for clarity) are indicated by the waveforms associated with signals YS and YC in FIG. 14. If the panels had no overlap region, the corrupted pixels would be abutted against each other, and a seam would be visible. An overlap region ten pixels wide has been found to be wide enough to compensate for three to five corrupted boundary pixels.

The redundant pixels advantageously allow blending of the side and center panels in the overlap region. A multiplier 1411 multiplies side panel signal YS by a weighting function W in the overlap regions, as illustrated by the associated waveform, before signal YS is applied to a signal combiner 1415. Similarly, a multiplier 1412 multiplies center panel signal YC by a complementary weighting function (1−W) in the overlap regions, as illustrated by the associated waveform, before signal YC is applied to combiner 1415. These weighting functions exhibit a linear ramp-type characteristic over the overlap regions and contain values between 0 and 1. After weighting, the side and center panel pixels are summed by combiner 1415 so that each reconstructed pixel is a linear combination of side and center panel pixels.

The weighting functions preferably should approach unity near the innermost boundary of the overlap region, and should approach zero at the outermost boundary. This will insure that the corrupted pixels have relatively little influence on the reconstructed panel boundary. The illustrated linear ramp type weighting function satisfies this requirement. However, the weighting functions need not be linear, and a nonlinear weighting function with curvilinear or rounded end portions, i.e. in the vicinity of 1 and 0 weight points, can also be used. Such a weighting function can readily be obtained by filtering a linear ramp weighting function of the type illustrated.

Weighting functions W and 1−W can be readily generated by a network including a look-up table responsive to an input signal representative of pixel positions, and a subtractive combiner. The side-center pixel overlap locations are known, and the look-up table is programmed accordingly to provide output values from 0 to 1, corresponding to weighting function W, in response to the input signal. The input signal can be developed in a variety of ways, such as by a counter synchronized by each horizontal line synchronizing pulse. Complementary weighting function 1−W can be produced by subtracting weighting function W from unity.

The principles of the disclosed invention are applicable to other types of standard broadcast television systems, such as PAL for example.

What is claimed is:

1. Apparatus for encoding a widescreen video signal representative of a widescreen image, comprising:
   means for generating a widescreen color video signal including luminance and chrominance information within horizontal image lines, said widescreen video signal having an aspect ratio greater than a standard aspect ratio and having a center panel signal component and left and right side panel signal components within horizontal image lines; and
   means for generating first and second simultaneous signals in response to the occurrence of each said horizontal image lines, wherein
   (a) left and right side panel high frequency chrominance information remains in a normal horizontal line spatial position in said first and second signals;
   (b) left side panel high frequency luminance information is disposed between left and right side panel high frequency chrominance information in said first signal; and
   (c) right side panel high frequency luminance information is disposed between left and right side panel high frequency chrominance information in said second signal.

2. Apparatus according to claims 1, wherein
   said chrominance information comprises left and right side panel color difference signal information;
   said left side panel high frequency luminance information is disposed between left and right side panel color difference signal information of a first type in said first signal; and
   said right side panel high frequency luminance information is disposed between left and right side panel color difference signal information of a second type in said second signal.

3. Apparatus according to claim 2, wherein:
   said first type color difference signal information is "I" information; and
   said second type color difference signal information is "Q" information.

4. Apparatus according to claim 1, wherein:
   said disposed high frequency luminance information is time expanded prior to being disposed between said high frequency chrominance information in said first and second signals, respectively.

5. Apparatus according to claim 1, wherein
   said first and second signals modulate an alternate subcarrier signal at a frequency other than a chrominance subcarrier frequency.

6. Apparatus according to claim 5, wherein
   said first and second signals quadrature modulate said alternate subcarrier.

7. Apparatus according to claim 5, and further comprising
   means for attenuating said modulated alternate subcarrier.

8. Apparatus according to claim 5, wherein:
   said widescreen color video signal comprises a luminance component comprising said luminance information and including vertical image detail information occupying a first frequency band, and a chrominance component comprising said chrominance information and including a chrominance subcarrier modulated with chrominance information occupying a second frequency band; and
   said alternate subcarrier frequency is between said first and second frequency bands.

9. Apparatus according to claim 8, wherein
   said alternate subcarrier frequency is an odd multiple of one-half of a horizontal image line scanning frequency.

10. Apparatus according to claim 8, wherein
    said alternate subcarrier frequency is approximately 2.368 MHz.

11. Apparatus according to claim 1, wherein
    low frequency side panel signal information is compressed into a horizontal image overscan region.

12. Apparatus for encoding a widescreen video signal representative of a widescreen image, comprising:
    means for generating a widescreen color video signal including luminance and chrominance information within a horizontal image line, said widescreen video signal having an aspect ratio greater than a standard aspect ratio and having a center panel signal component and left and right side panel signal components within said horizontal image line;
    means for time expanding left side panel and right side panel high frequency luminance information;
    means for generating first and second signals in response to the occurrence of each said horizontal image lines, wherein
    (a) left and right side panel high frequency chrominance information remains in a normal horizontal line spatial position in said first and second signals;
    (b) time expanded right side panel high frequency luminance information is disposed between left and right side panel high frequency chrominance information in said first signal; and
    (c) time expanded right side panel high frequency luminance information is disposed between left and right side panel high frequency chrominance information in said second signal;
    means for separating said center panel signal component from said widescreen video signal;

means for time expanding said separated center panel signal component;

means for time compressing low frequency side panel information into a horizontal image overscan region;

means for combining said center panel signal component with said compressed low frequency side panel information to produce a center/side lows signal;

means for modulating an alternate subcarrier with said first and second signals, said alternate subcarrier being at a frequency other than a chrominance subcarrier frequency; and means for combining said center/side lows signal and said modulated alternate subcarrier.

13. A system for processing an encoded widescreen color video signal including luminance and chrominance information within horizontal image lines and representative of a widescreen image having an aspect ratio greater than a standard aspect ratio, having a center panel signal component and left and right side panel signal components within horizontal image lines, and including first and second signal components simultaneously developed during horizontal line intervals wherein (a) left and right side panel high frequency chrominance information remains in a normal horizontal line spatial position in said first and second signal components, (b) left side panel high frequency luminance information is disposed between left and right side panel high frequency chrominance information in said first signal component, and (c) right side panel high frequency luminance information is disposed between left and right side panel high frequency chrominance information in said second signal component; said system comprising:

an image display device;

means for decoding said first and second signal components to recover said left and right side panel high frequency chrominance information and said left and right side panel high frequency luminance information;

means for combining said recovered side panel information with center panel information to produce a combined signal; and means for coupling said combined signal to said image display device.

14. A system according to claim 13, wherein said chrominance information comprises color difference information;

said left side panel high frequency luminance information is disposed between left and right side panel color difference information of a first type in said first signal component; and said right side panel high frequency luminance information is disposed between left and right side panel color difference signal information of a second type in said second signal component.

15. A system according to claim 14, wherein;
said first type color difference signal information is "I" information; and
said second type color difference signal information is "Q" information.

16. A system according to claim 13, wherein:
said disposed high frequency luminance information is time expanded prior to being disposed between said high frequency chrominance information in said first and second signal components, respectively.

17. A system according to claim 16, wherein said decoding means includes means for time compressing said time expanded high frequency luminance information.

18. A system according to claim 13, wherein said first and second signal components modulate an alternate subcarrier signal at a frequency other than a chrominance subcarrier frequency; and
said decoding means includes means for demodulating said alternate subcarrier signal.

19. A system according to claims 18, wherein said first and second signal components quadrature modulate said alternate subcarrier.

20. A system according to claim 18, wherein said widescreen color video signal comprises a luminance component comprising said luminance information and including vertical image detail information occupying a first frequency band, and a chrominance component comprising said chrominance information and including a chrominance subcarrier modulated with chrominance information occupying a second frequency band; and
said alternate subcarrier frequency is between said first and second frequency bands.

21. A system according to claims 13, wherein low frequency side panel signal information is time compressed into a horizontal image overscan region; and
said decoding means includes means for time expanding said compressed low frequency side panel signal information.

22. A system according to claim 13, wherein said decoding means includes:
time demultiplexing means for decoding said first and second signal components to recover said left and right side panel high frequency luminance and chrominance information; and
means for time compressing said recovered side panel high frequency luminance information.

23. A system for processing a widescreen video signal representative of a widescreen image, comprising means for generating a widescreen color video signal including luminance and chrominance information within horizontal image lines and representative of a widescreen image having an aspect ratio greater than a standard aspect ratio, having a center panel signal component and left and right side panel signal components within horizontal image lines; said generated video signal including first and second signal components simultaneously developed during horizontal line intervals wherein (a) left and right side panel high frequency chrominance information remains in a normal horizontal line spatial position in said first and second signal components, (b) left side panel high frequency luminance information is disposed between left and right side panel high frequency chrominance information in said first signal component, and (c) right side panel high frequency luminance information is disposed between left and right side panel high frequency chrominance information in said second signal component;

means for transmitting said widescreen video signal including said first and second signal components via a signal transmission channel;

means for receiving said transmittal signal, said receiving means comprising an image display device;

means for decoding said first and second signal components to recover said left and right side panel high frequency chrominance information and said left and right side panel high frequency luminance information;

means for combining said recovered side panel information with center panel information to produce a combined signal; and means for coupling said combined signal to said image display device.

24. A system according to claim 23, wherein said chrominance information comprises color difference information;

said left side panel high frequency luminance information is disposed between left and right side panel color difference information of a first type in said first signal component; and said right side panel high frequency luminance information is disposed between left and right side panel color difference information of a second type in said second signal component.

25. A system according to claim 24, wherein said first and second types of color difference information represent "I" and "Q" color difference information, respectively.

26. A system according to claim 23, wherein said first and second signal components modulate an alternate subcarrier at a frequency other than a chrominance subcarrier frequency, and said decoding means includes means for demodulating said alternate subcarrier.

* * * * *